United States Patent [19]

Lai et al.

[11] 4,301,124

[45] * Nov. 17, 1981

[54] COBALT SOLVENT EXTRACTION WITH DIOXIME ION EXCHANGERS

[75] Inventors: Ralph W. M. Lai, Lexington; John K. Litchfield, Bedford, both of Mass.

[73] Assignee: Kennecott Corporation, Stamford, Conn.

[*] Notice: The portion of the term of this patent subsequent to Feb. 3, 1988, has been disclaimed.

[21] Appl. No.: 162,538

[22] Filed: Jun. 24, 1980

Related U.S. Application Data

[63] Continuation of Ser. No. 11,034, Feb. 9, 1979, Pat. No. 4,248,837.

[51] Int. Cl.$^3$ ............................................. C01G 51/00
[52] U.S. Cl. ...................................... 423/24; 423/139
[58] Field of Search ................. 423/24, 139, DIG. 14; 75/101 BE; 260/438.1, 439 R, 566 A

[56] References Cited

U.S. PATENT DOCUMENTS

| | | | |
|---|---|---|---|
| 3,197,274 | 7/1965 | White. | |
| 3,224,873 | 12/1965 | Swanson. | |
| 3,276,863 | 10/1966 | Drobnick et al. | |
| 3,592,775 | 7/1971 | Swanson. | |
| 3,666,446 | 11/1969 | Cook et al. | 423/24 |
| 3,703,573 | 11/1972 | Blytas | 423/139 |
| 4,139,502 | 2/1979 | Halmann | 423/139 |
| 4,173,616 | 11/1979 | Koenders | 423/24 |

FOREIGN PATENT DOCUMENTS

2754539 6/1978 Fed. Rep. of Germany.
986368 3/1965 United Kingdom.

OTHER PUBLICATIONS

Stary, "The Solvent Extraction of Metal Chelates, Pergamon Press, N.Y., (1964), pp. 21, 22, 31–34, 37, 40, 41, 101–105.
Clingman, "Selective Liquid Ion-Exchangers", *J. Appl. Chem.*, 13, May 1963, pp. 193–198.
Peskova et al., "Issledevanie Analiticheskikh Svoystv Tenil–Anizildioksima", *Analiticheskoy Khimi*, 1956, pp. 3–14.
Ashbrook, "Chelating Reagents in Solvent Extraction Processes: The Present Position", *Coordination Chemistry Reviews*, 16 (1975), pp. 285–307.
Burkin et al., "α-Substituted Oxime Extractants–II", *J. Inorg. Nucl. Chem.*, vol. 37, pp. 2187–2195.
Matynshin et al., *Chemical Abstracts*, vol. 79, (1973), #42422a.
*Chemical Abstracts*, vol. 53, #1976d (1959), "Compounds of Copper, Nickel, Cobalt with a Few Dioximes".
"Analytical Chemistry of Nickel", by V. M. Peshkova et al.
Starry, "The Solvent Extraction of Metal Chelates", *Pergamon Press*, NY, (1964), pp. 21, 22, 31–34, 37, 40, 41, 101–105.
Niedenzu, Ed. "Preparation of Transition Metal Derivatives", *Academic Press*, NY, (1976), pp. 376–377.

*Primary Examiner*—Brian E. Hearn
*Attorney, Agent, or Firm*—John L. Sniado; Anthony M. Lorusso

[57] ABSTRACT

Dioxime extractants having the following general formula:

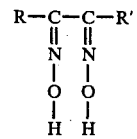

where R and R' may be any of a variety of organic hydrocarbon radicals such as aliphatic, alkyl and aryl radicals. R and R' may also be hydrogen. Preferably R is an unsaturated hydrocarbon or branch chain alkyl group containing from about 3 to 20 carbon atoms and R' is hydrogen or an unsaturated hydrocarbon or branch chain alkyl group containing from about 1 to 10 carbon atoms. Preferably, there is a difference of about 3 to 10 carbon atoms between R and R' resulting in dissymmetry of the resulting dioxime molecule. Preferably, the dioximes also contain a total of about 5 to 32 carbon atoms. Representative compounds are methyl octyl dioxime and methyl hexyl dioxime.

Organic preparations containing such dioximes are useful for the extraction of copper, nickel and cobalt metal values from acid or basic aqueous solution.

2 Claims, No Drawings

COBALT SOLVENT EXTRACTION WITH DIOXIME ION EXCHANGERS

This is a continuation of application Ser. No. 11,034, filed Feb. 9, 1979, now U.S. Pat. No. 4,248,837.

BACKGROUND OF THE INVENTION

It is known that various metal values, particularly copper and nickel values can be extracted from aqueous leach solutions with oximes. Basically, this prior art procedure includes the steps of contacting the metal containing aqueous solution with a water immiscible organic phase containing the oxime. By allowing the oxime in the organic phase to contact the metal values in the aqueous phase through mixing, metal values are extracted from the aqueous phase onto the oxime in the organic phase. The loaded organic phase is easily separated from the aqueous solution by virtue of the immiscibility of the two phases. Once the organic phase is separated from the aqueous phase, the metal values can be stripped from the loaded oxime by contacting the oxime with a stripping agent. The stripped metals then can be reduced to their elemental form by a variety of reduction procedures including electrowinning. Patents directed to oximes which are representative of the prior art include U.S. Pat. No. 3,224,873 to Swanson entitled "Liquid-Liquid Recovery of Copper Values Using α-Hydroxy Oximes"; U.S. Pat. No. 3,592,775 to Swanson entitled "Compositions Containing Phenolic Oximes and Certain α-Hydroxy Aliphatic Oximes"; and U.S. Pat. No. 3,276,863 to Drobnick entitled "Separation of Nickel and Cobalt Values Using α-Hydroxy Oximes". U.S. Pat. No. 3,197,274 to White entitled "Liquid-Liquid Recovery of Metal Values Using Hydroxyamine Extractants" discloses similar technology; but the extractant disclosed therein is an amine.

Factors to be considered in the selection of an ion exchanger such as an oxime include loading capacity, tendency to form emulsions (particularly at high pH's), extraction kinetics, stripping rate, and phase separation rates.

SUMMARY OF THE INVENTION

In accordance with the present invention, a dioxime extractant for the extraction of copper and nickel is provided. The extractant has a high loading capacity, has a low tendency to form emulsions at high pH's, exhibits good extraction kinetics, good stripping rates, and good phase separation.

Accordingly, it is an object of the invention to provide novel ion exchange preparations for the extraction of copper and nickel which preparations exhibit high loading capacities, low tendency to form emulsions at high pH's, good extraction kinetics, good stripping rates, and good phase separation.

DESCRIPTION OF THE PREFERRED EMBODIMENT

At the outset, the invention is described in its broadest overall aspects with a more detailed description following.

Broadly, the process of the present invention comprises contacting a metal containing aqueous solution with a water immiscible organic phase containing a hydrocarbon solvent and a dioxime compound. The dioxime extractants used in the present invention have the following general formula:

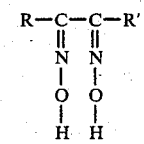

where R and R' may be any of a variety of organic hydrocarbon radicals such as aliphatic, alkyl, and aryl radicals. R and R' may also be hydrogen. Preferably, R is an unsaturated hydrocarbon or branch chain alkyl group containing from about 3 to 20 carbon atoms and R is hydrogen or an unsaturated hydrocarbon or branch chain alkyl group containing from about 1 to 10 carbon atoms. Preferably, there is a difference of about 3 to 10 carbon atoms between R and R' resulting in dissymmetry of the resulting dioxime molecule. Preferably, the dioximes also contain a total of about 5 to 32 carbon atoms.

The dioxime of the present invention is utilized in an organic solvent. In the recovery process, the dioxime dissolved in the solvent forms a complex with the metal to be extracted, which complex is soluble in the organic solvent. The water-immiscible solvents usually employed for this purpose are aliphatic hydrocarbon solvents such as the petroleum derived liquid hydrocarbons, either straight chained or branched, such as kerosene, fuel oil, etc. Various aromatic solvents may also be used such as benzene, toluene, xylene, and other aromatic solvents, for example, those derived from petroleum processing which may contain alkyl substituted aromatic materials. Typical of the later are solvents sold under the Panasol trademark by Amoco Chemicals Corporation. These solvents are liquid and essentially insoluble in water. Generally, all these hydrocarbon solvents have specific gravities in the range of 0.65–0.95 and have a mid-boiling point in the approximate range of 120° F.–615° F. (ASTM Distillation). In addition to the simple hydrocarbon solvents, the chloronated hydrocarbons may be used and in some instances may improve solubility. Accordingly, both the unsubstituted and the chloronated solvents are contemplated by the term liquid hydrocarbon. Of course the critical factor on the choice of a solvent is the solubility of the dioxime in it. Thus any organic solvent which will dissolve the dioxime and the resulting metal complex and remain immiscible with water is usable.

The amount of dioxime in the organic solvent can vary within considerable limits. In general, however, the concentrations of total dioxime is in the range of 1 to 15% by weight based on the weight of the organic extracting solution. Preferably, the amount of the dioxime is in the range of 2 to 10% of the weight of the solution. The solubility of dioxime in an organic solvent can be increased with the addition of long chained alcohol such as amyl alcohol.

The following examples will illustrate the preparation of typical dioximes useful in the present invention and also the process of effecting the extraction using such compounds. It is to be understood, however, that these examples are illustrative only and do not limit the invention. Unless otherwise indicated, all parts and percentages are by weight.

EXAMPLE I

Organic Synthesis of Methyl Hexyl Dioxime

Methyl Hexyl Dioxime,

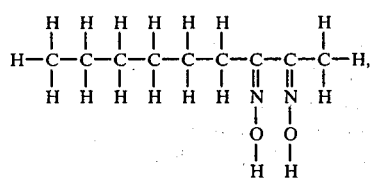

was synthesized as follows: 2-nonanone was first oxidized with n-butyl nitrite. The resulting reaction mixture was made basic with potassium hydroxide solution and extracted with ether. Following flash evaporation of the ether solution, the solid 3-isonitroso-2-nonanone was obtained via steam distillation of the residue.

Reaction of the solid 3-isonitroso-2-nonanone with hydroxylamine hydrochloride in dilute ethanol under slightly acid conditions gave impure methyl hexyl dioxime. Three crystallizations from dilute ethanol-water (one using activated carbon) gave the white solid dioxime product with a melting point of 160-161 degree C.

EXAMPLE II

Organic Synthesis of Methyl Octyl Dioxime

The synthesis of methyl octyl dioxime,

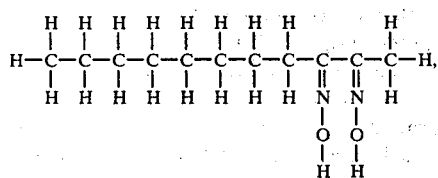

was similar to the synthesis of methyl hexyl dioxime, except that 2-undercanone was substituted for 2-nonanone as a starting material.

EXAMPLE III

Extraction of Base Metals with Methyl Octyl Dioxime

Three series of experiments were conducted for the extractions of copper, nickel, and cobalt from aqueous solutions with methyl octyl dioxime to evaluate the metal extraction efficiency as a function of pH. The metal contents of the solutions were 5.9 g/l copper, 5.4-6.5 g/l nickel and 0.6 g/l cobalt. The metal ions in aqueous were added as sulfates, and the solution pH was adjusted with ammonium hydroxide or sulfuric acid. The organic solvent was made up with a mixture of 50% amyl alcohol and 50% kerosene. A 2.5 weight percent of methyl octyl dioxime was dissolved in the organic phase as an ion exchanger.

In each test, an equal ratio of organic and aqueous was mixed in a 250 ml separatory funnel for two minutes at room temperature. After the mixing, the organic and aqueous phases were allowed to separate and the raffinate analyzed for metal content by atomic adsorption spectroscopy.

The experimental results are summarized in Table I. Maximum extractions for copper, nickel, and cobalt occurred at pH 8.7, 10-10.5, and 9.5-10 respectively.

TABLE I

Extraction of Base Metals with Methyl Octyl Dioxime

| Test No. | Base Metal | pH | Initial Conc. g/l | Raffinate g/l | % Extracted | Loading Capacity g/g organic |
|---|---|---|---|---|---|---|
| A | Cu | 2.1 | 5.9 | 5.55 | 6% | .017 |
| B | Cu | 3.6 | 5.9 | 3.58 | 39% | .116 |
| C | Cu | 5.0 | 5.9 | 1.94 | 67% | .198 |
| D | Cu | 8.7 | 5.9 | .18 | 97% | .280 |
| A | Ni | 7.0 | 6.45 | 6.40 | 1% | .005 |
| B | Ni | 8.4 | 6.10 | 5.85 | 4% | .015 |
| C | Ni | 9.5 | 5.90 | 4.55 | 23% | .067 |
| D | Ni | 10.2 | 5.70 | 3.55 | 38% | .105 |
| E | Ni | 10.5 | 5.40 | 3.25 | 38% | .105 |
| A | Co | 3.7 | .575 | .575 | 0% | .0 |
| B | Co | 7.2 | .575 | .525 | 9% | .002 |
| C | Co | 8.5 | .575 | .098 | 83% | .024 |
| D | Co | 9.5 | .575 | .018 | 97% | .028 |
| E | Co | 10.0 | .575 | 7 ppm | 99% | .029 |

Note:
(a) Organic to aqueous ratio = 1
(b) 2.5% methyl octyl dioxime in organic phase

EXAMPLE IV

Extraction of Base Metals with Methyl Hexyl Dioxime

Three series of experiments were also conducted for the extraction of copper, nickel, and cobalt with methyl hexyl dioxime to evaluate the metal extraction efficiency as a function of pH. The experimental procedures were similar to the experiments for methyl octyl dioxime. The metal contents of the solutions used in these tests were 10.1-10.6 g/l copper, 5.9-6.7 g/l nickel, and 0.5 g/l cobalt. Maximum extractions occurred at pH 6.4-9.0, 9.9 and 8.9 for copper, nickel and cobalt respectively. The experimental results are summarized in Table II.

TABLE II

Extraction of Base Metals with Methyl Hexyl Dioxime

| Test No. | Base Metal | pH | Initial Conc. g/l | Raffinate g/l | % Extraction | Loading Capacity g/g organic |
|---|---|---|---|---|---|---|
| A | Cu | 2.5 | 10.60 | 8.38 | 21% | .110 |
| B | Cu | 3.7 | 10.55 | 6.44 | 39% | .200 |
| C | Cu | 4.4 | 10.40 | 4.88 | 53% | .275 |
| D | Cu | 6.4 | 10.20 | .22 | 98% | .500 |
| E | Cu | 9.0 | 10.10 | .41 | 96% | .485 |
| A | Ni | 6.9 | 6.60 | 6.23 | 6% | .018 |
| B | Ni | 7.9 | 6.56 | 4.65 | 30% | .095 |
| C | Ni | 9.4 | 6.25 | 3.19 | 49% | .153 |
| D | Ni | 9.9 | 5.95 | 2.88 | 52% | .154 |
| A | Co | 4.5 | .51 | .48 | 1% | .002 |
| B | Co | 6.8 | .50 | .44 | 12% | .003 |
| C | Co | 7.6 | .49 | .23 | 53% | .013 |
| D | Co | 8.9 | .48 | .02 | 99% | .023 |

Note:
(a) Organic to aqueous ratio = 1
(b) 2.5% methyl octyl dioxime in organic phase Comparisons of the ion extractors of the present invention with a commercially available extractant was made. The commercially available extractant was LIX 64N which is a mixture of

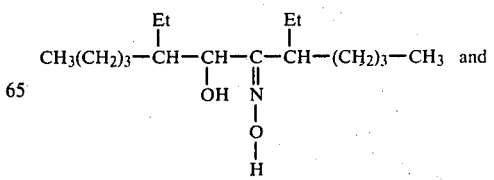

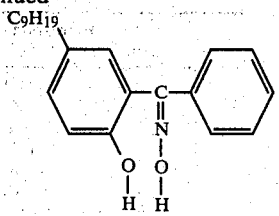

and which is sold by General Mills. Extraction of base metals with LIX 64N is shown in Table III.

Extraction of Base Metals with LIX 64N

For comparing the extraction efficiencies of the dioximes and the commercially available ion exchangers, LIX 64N was chosen for direct comparison.

The experiments were conducted for the extraction of copper and nickel. The initial concentrations of copper and nickel in the solutions were 8.5–10.7 g/l and 3.8–4.2 g/l respectively. The experiments were conducted similarly to those for the dioximes.

TABLE III

Extraction of Base Metals with LIX 64N

| Test No. | Base Metal | pH | Initial Conc. g/l | Raffinate g/l | % Extract | Loading Capacity g/g organic |
|---|---|---|---|---|---|---|
| A | Cu | 2.7 | 10.69 | 8.00 | 20% | .162 |
| B | Cu | 4.5 | 10.60 | 7.60 | 28% | .181 |
| C | Cu | 6.0 | — | — | — | Emulsified |
| A | Cu | 2.9 | 8.65 | 7.63 | 12% | .061 |
| B | Cu | 4.6 | 8.60 | 7.35 | 15% | .075 |
| C | Cu | 9.1 | 8.55 | 5.40 | 37% | .190 |
| A | Ni | 4.2 | 4.20 | 3.95 | 5% | .014 |
| B | Ni | 6.6 | 4.15 | 3.25 | 23% | .054 |
| D | Ni | 8.9 | 3.95 | 2.40 | 40% | .090 |
| E | Ni | 9.3 | 3.80 | 2.30 | 40% | .090 |

Note:
(a) Organic to aqueous ratio = 1
(b) 2% LIX 64N in kerosene

EXAMPLE V

Comparison Between Methyl Octyl Dioxime and LIX 64 N for an Ammonium Nitrate Solution An ammonium nitrate artificial in-situ solution containing 2 g/l copper and a high level of ammonia, ammonium sulfate and nitrate was used for cumulative loading tests. The organic to aqueous ratio was kept at 1. Mixing was conducted in a 250 ml separatory funnel at room temperature for 2 minutes. After the mixing, the two phases were allowed to separate, and the raffinate was decanted. A new aqueous solution was again added to the partially loaded organic for additional extraction of copper. This procedure was repeated until no further copper was extracted from the fresh copper solution. The experimental results are summarized in Table IV. The cumulative loading capacity for methyl octyl dioxime was 0.107 g Cu/g organic. The cumulative loading capacity for LIX 64 N was 0.072 g Cu/g organic.

TABLE IV

Cumulative Copper Loading Capacity of Methyl Octyl Dioxime and LIX 64N (Use 2 g/l Cu Solution)*

| Extractants | Loading Steps | pH Raffinate | Cu g/l Before |
|---|---|---|---|
| Methyl Octyl dioxime | 1 | 9.2 | 1.98 |
| | 2 | 9.3 | 1.98 |
| | 3 | 9.3 | 1.98 |

| g/l After | Cu Extracted g | g Cu/g Organic | Cumulative g Cu/g Organic |
|---|---|---|---|
| 0.43 | 0.116 | 0.0773 | 0.0773 |
| 1.42 | 0.042 | 0.0280 | 0.1053 |
| 1.95 | 0.002 | 0.0013 | 0.1066 |

| Extractants | Loading Steps | pH Raffinate | Cu g/l Before |
|---|---|---|---|
| LIX 64N | 1 | 9.3 | 1.98 |
| | 2 | 9.3 | 1.98 |
| | 3 | 9.3 | 1.98 |

| g/l After | Cu Extracted g | g Cu/g Organic | Cumulative g Cu/g Organic |
|---|---|---|---|
| 0.80 | 0.0885 | 0.0708 | 0.0708 |
| 1.95 | 0.002 | 0.0016 | 0.0724 |
| 2.00 | 0.000 | 0.000 | 0.0724 |

Note:
(1) Mixing time = 2 minutes
(2) Organic to aqueous ratio = 1
(3) Volume of organic or aqueous = 75 ml
(4) Organic phases are Amyl alcohol containing 2% methyl octyl dioxime; Kerosene containing 1.66% LIX 64N.
*Cu Solution contains:
2 g/l Cu (as Cu Nitrate)
1 g/l NaCl
.5M $(NH_4)_2SO_4$
.4M $NH_4OH$ Cumulative Loading Capacity of Copper Two series of runs to determine cumulative copper loading capacity were conducted for methyl hexyl dioxime, methyl octyl dioxime, and LIX 64 N. In the first series, a comparison was made between methyl octyl dioxime and LIX 64 N. The solvents used were amyl alcohol for the dioxime and kerosene for LIX 64 N. In the second series, a comparison was made for between octyl dioxime, methyl hexyl dioxime and LIX 64 N. The solvent for the dioximes in the second series was a mixture of 50% amyl alcohol and 50% kerosene, the solvent for LIX 64 N was kerosene. The results are described below.

EXAMPLE VI

Comparison Among Methyl Octyl Dioxime, Methyl Hexyl Dioxime and LIX 64 N for Ammonium Copper Sulfate Solution A solution containing 6 g/l copper was used for cumulative loading tests. The experiments were conducted similar to that of Example V. The cumulative loading tests were repeated for three steps for the dioximes, however, there was only one extraction step applicable to LIX 64 N due to the problem of emulsification. The experimental results are summarized in Table V. The cumulative loading experiments were terminated at the third stage due to the thickening of the organic phase which made mixing difficult. The partially loaded dioximes in Table V have capacities of 0.64 g Cu/g organic and 0.73 g Cu/g organic for methyl octyl dioxime and methyl hexyl dioxime respectively.

TABLE V

Cumulative Copper Loading Capacity of the Dioximes and LIX 64N
(Use 6 g/l Cu Solution)

| Extractants | Loading Steps | pH Raffinate | Cu Before | Cu g/l After | Cu Extracted g | g Cu/g Organic | Cumulative g Cu/g Organic |
|---|---|---|---|---|---|---|---|
| Methyl Octyl dioxime | 1 | 9.4 | 5.79 | 0.050 | 0.574 | 0.2870 | 0.2870 |
| | 2 | 9.5 | 5.79 | 0.895 | 0.489 | 0.2445 | 0.5315 |
| | 3 | 9.5 | 5.79 | 3.64 | 0.215 | 0.1075 | 0.6390 |
| Methyl hexyl dioxime | 1 | 9.3 | 5.79 | 0.047 | 0.574 | 0.2870 | 0.2870 |
| | 2 | 9.5 | 5.79 | 0.745 | 0.504 | 0.2520 | 0.5390 |
| | 3 | 9.5 | 5.79 | 1.9 | 0.389 | 0.1945 | 0.7335 |
| LIX 64N | 1 | 9.5 | 5.79 | 4.55 | 0.124 | 0.1550 | 0.1550* |

Note:
(1) Mixing time = 3 minutes
(2) Organic to aqueous ratio = 1:1
(3) Volume of organic = 100 ml
(4) Organic phases are
(a) 1.66% LIX 64N in Kerosene
(b) 2% dioximes in a mixture of 50% amyl alcohol and 50% kerosene.
*Emulsified after the first loading

EXAMPLE VII

Extraction of Multiple Metal Ions with Methyl Hexyl Dioxime and LIX 64 N

Two series of experiments were conducted to evaluate the extraction of several metal ions simultaneously. The solutions used were simulated Cuprion pregnant liquor containing 30 g/l $NH_3$ and 89 g/l $NH_3$ respectively. The major metal ions in the solutions are copper (3.2–3.7 g/l), nickel (3.5–3.6 g/l), and cobalt (0.20–0.22 g/l).

The experimental procedures are similar to those for the extraction of copper as described above.

The experimental results are summarized in Table VI.

TABLE VI

Extraction of Base Metals with Methyl Hexyl Dioxime and LIX 64N

| Extractants | Test No. | pH | NH₃ g/l | Initial Conc. g/l Cu | Ni | Co |
|---|---|---|---|---|---|---|
| Methyl Hexyl Dioxime | 114A | 10.4 | 89 | 3.16 | 3.63 | 0.219 |
| | 115A | 9.5 | 30 | 3.70 | 3.48 | 0.202 |
| LIX 64N | 114B | 10.4 | 89 | 3.16 | 3.63 | 0.219 |
| | 115B | 9.5 | 30 | 3.70 | 3.48 | 0.202 |

| Extraction Steps | Raffinate, g/l Cu | Ni | Co |
|---|---|---|---|
| 1 | 1.99 | 2.25 | 0.210 |
| 2 | 3.50 | 2.85 | 0.200 |
| 3 | 3.40 | 3.05 | 0.209 |
| 1 | 2.30 | 1.83 | 1.83 |
| 1 | 1.43 | 3.59 | 0.203 |
| 2 | 3.00 | 3.54 | 0.200 |
| 3 | 3.10 | 3.61 | 0.204 |
| 1 | 2.15 | 3.30 | 0.183 |

| Extraction Steps | Extracted g Cu | Ni | Co |
|---|---|---|---|
| 1 | 0.117 | 0.138 | 0.009 |
| 2 | (−0.034) | 0.078 | 0.019 |
| 3 | (−0.024) | 0.058 | 0.012 |
| 1 | 0.140 | 0.165 | 0.017 |
| 1 | 0.173 | 0.004 | 0.016 |
| 2 | 0.016 | 0.009 | 0.018 |
| 3 | 0.006 | 0.002 | 0.016 |
| 1 | 0.155 | 0.018 | 0.017 |

| Extraction Steps | Cumulative g/g organic Cu | Ni | Co |
|---|---|---|---|
| 1 | 0.059 | 0.069 | 0.005 |
| 2 | 0.042 | 0.108 | 0.014 |
| 3 | 0.030 | 0.137 | 0.020 |
| 1 | 0.070 | 0.082 | 0.008 |
| 1 | 0.072 | 0.002 | 0.006 |
| 2 | 0.079 | 0.006 | 0.014 |
| 3 | 0.081 | 0.007 | 0.020 |
| 1 | 0.065 | 0.007 | 0.008 |

Note:
(a) 2 weight percent methyl hexyl dioxime in 50% Amyl alcohol, 50% kerosene 2 weight percent LIX 64N in kerosene
(b) Volume of organic 100 ml

Semiquantitative Evaluation of Extraction, Stripping and Phase Separation Rates Extraction and stripping rates for copper were compared for LIX 64 N and two dioximes. The organic phases used were a 2.5% LIX 64 N in kerosene and a 2.5% dioxime in amyl alcohol. A copper solution of 2 g/l Cu at approximately pH 9 was used for the extraction experiments. The stripping solution was a dilute sulfuric acid at pH 1.8.

The extraction rate experiments were conducted in small glass bottles with an organic to aqueous ratio of one. The extraction rates were determined to be the number of shakes required for the aqueous to become clear, indicating complete copper extraction. The stripping rates were determined by counting the number of shakes required for the organic to become clear, thus indicating complete stripping.

The phase separation times were measured to be the time required for complete phase separation after shaking for 2 minutes using a "shaker in the round" laboratory shaker. The results are summarized in Table VII.

TABLE VII

Extraction, Stripping and Phase Separation Rates

| Extractant | EXTRACTION pH | Ext. Rate (# of shakes) | Phase Sep. rate (min) | STRIPPING pH | Str. rate (# of shakes) | Phase Sep. rate (min) |
|---|---|---|---|---|---|---|
| LIX 64N | 8.9 | 15 | 1.5 | 1.4 | 8 | 0.3 |
| Methyl Octyl Dioxime | 8.8 | 4 | 0.1 | 1.4 | 2 | 0.2 |
| Methyl Hexyl Dioxime | 9.1 | 4 | 0.3 | 1.4 | 2 | 0.2 |

Conclusion

The straight-chain aliphatic groups of the alkyl dioximes provide the following unique advantages:

a. low solubility in aqueous and hence less organic loss.

b. high metal extraction capacity as a consequence of double dioxime groups.

c. Better phase separation rate due to omission of cyclic group and low solubility in aqueous.

d. Excellent kinetics in extraction and stripping.

The pH range for copper extraction with dioximes and LIX 64 N, as indicated in Tables I, II, and III, are similar. The effective copper extraction pH of the three extractants is above 2, while the effective stripping pH is below 2. The loading capacity of the dioximes is much higher than that of the LIX 64 N.

The minimum pH for nickel extraction with the dioximes differs from that of LIX 64 N. The dioximes begin to extract nickel at pH 6.5. The minimum pH for nickel extraction by LIX 64 N is known to be 4 or above. It is of interest to notice that the effective nickel extraction pH for the three extractants differ slightly from each other, e.g., the effective pH for methyl octyl dioxime is above pH 9.5, the effective pH for methyl hexyl dioxime is above 7.5, and the effective pH for LIX 64 N is above pH 5.5.

These differences offer an excellent chance for selecting an extractant to match an aqueous solution from which nickel can be extracted without readjusting the solution pH.

The cumulative copper loading of methyl octyl dioxime indicated a maximum loading capacity of 0.107 g copper/g dioxime, which is about 53% higher than that of LIX 64 N.

The copper sulfate solutions used for cumulative copper loading in this series contained up to 10 g/l copper. Table V indicated that the maximum copper loading capacity for the two dioximes and LIX 64 N are higher than that from ammonium nitrate solutions.

LIX 64 N emulsified in the first stage of mixing, indicating that its usable capacity had been exceeded. The dioximes exhibited a superior extraction capacity, and did not emulsify. The total loading capacity, for three stages, was 0.64 g Cu/g and 0.73 g Cu/g for methyl octyl dioxime and methyl hexyl dioxime as compared with 0.16 g Cu/g for LIX 64 N.

The extraction of multiple metals with methyl hexyl dioxime and LIX 64 N is summarized in Table VI. Experiment 114A was a cumulative extraction study for Cu, Ni, and Co in an ammoniacal solution containing 89 g/l NH$_3$. In the first stage of extraction, as indicated in Table VI, high copper was extracted. However, in subsequent stages, the copper was replaced by nickel and cobalt. At the end of the third stage, the copper loading was 0.03 g/g and the nickel loading was 0.137 g/g. The cobalt extraction was 0.02 g/g.

Experiment 114B in Table VI indicates that the extraction of Cu, Ni, and Co with LIX 64 N, unlike that of methyl hexyl dioxime, followed a general trend of stepwise increase for both copper and nickel. Apparently, there was no substitution of nickel for copper during the second and third stages. The cumulative loading of Cu, Ni, and Co were 0.081 g/g, 0.007 g/g, and 0.02 g/g respectively. The significant difference in the tests 114A and 114B is that methyl hexyl dioxime has a higher affinity for nickel than copper, while LIX 64 N has a higher affinity for copper than nickel.

The above phenomena dictates two applicable strategies in a selective winning of copper and nickel. For LIX 64 N copper and nickel can be extracted simultaneously at a high pH and selectively stripped at different pH's. For methyl hexyl dioxime, nickel and copper can be extracted and stripped selectively at a given alkaline pH.

Experiments 115A and 115B were conducted for the extraction of base metals from a low ammonia solution containing 35 g/l NH$_3$. In this solution, 35 g/l NH$_3$, the selection of copper over nickel by LIX 64 N was similar to that of the high ammonia solution. The selection of nickel to copper with methyl hexyl dioxime is not distinguishable.

Table VII gives the results of semiquantitative measurements of the extraction, stripping, and phase separation rates. Extraction rates were measured as the number of shakes required for complete extraction of copper from an aqueous solution. The results indicate that the dioximes load about four times faster than LIX 64 N. The phase separation rates for the dioximes were up to fifteen times faster than for LIX 64 N.

Table VII also indicates that the stripping rate of LIX 64 N was about four times longer than that of the dioximes, while its associated phase separation rate was about 50% longer.

It is evident from the above results that the dioximes are superior to that of LIX 64 N in terms of the phase separation rates, and metal extraction and stripping rates in a solvent extraction operation.

From the foregoing, it can be seen that one aspect of the invention is a solution suitable for use as an organic extractant for the extraction of copper, nickel and cobalt values from either acidic or basic leach liquors. The organic extractant solution includes a dioxime of the type disclosed herein dissolved in a water-immiscible organic solvent. The total amount of dioxime in the organic extractant solution is in the range of 1–15% by weight with 2–10% by weight being preferred. Preferably, the organic solvent contains a long chain alcohol (C$_4$ or higher) that is a liquid at room temperature, amyl alcohol is the preferred alcohol. The long chain alcohol may comprise 100% of the organic solvent. However, it is preferred to dilute the long chain alcohol with other less expensive solvents. The long chain alcohol should comprise about 20% of the solvent. For example, the organic solvent may be a mixture of 50% amyl alcohol and 50% kerosene.

Another aspect of the invention involves utilizing the disclosed organic extractant in the process for extracting copper, nickel and cobalt. The process includes the step of contacting an aqueous solution containing the foregoing metal values with an organic extractant comprising the dioximes of the present invention in an organic solvent; separating the resultant metal-pregnant phase from the aqueous phase; and recovering the metal from the metal-pregnant organic phase by stripping the metal therefrom and reducing the metal values in the stripped solution to their elemental form.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for the recovery of cobalt values from an aqueous solution containing cobalt values comprising:

1. contacting said aqueous solution with a water-immiscible organic extractant solution containing methyl hexyl dioxime or methyl octyl dioxime, wherein said aqueous solution is at a pH of at least 9.5, said dioxime being dissolved in an essentially water-immiscible organic solvent, said dioxime comprising between 1-15% by weight of the resulting solution; and, 2. separating the resulting metal-pregnant organic phase from the aqueous phase.

2. A process for the recovery of an extractable metal value selected from the group consisting of copper, nickel, cobalt and mixtures thereof from an aqueous solution comprising:

1. contacting said aqueous solution with a water-immiscible organic extractant solution containing methyl octyl dioxime, wherein said aqueous solution is at a pH of at least 9.5, said methyl octyl dioxime being dissolved in an essentially water-immiscible organic solvent, said methyl octyl dioxime comprising between 1-15% by weight of the resulting solution; and, 2. separating the resulting metal-pregnant organic phase from the aqueous phase.

* * * * *